United States Patent
Couvreur

(10) Patent No.: US 8,364,782 B2
(45) Date of Patent: Jan. 29, 2013

(54) AD-FUNDED WEB SERVICES

(75) Inventor: Julien Couvreur, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 99 days.

(21) Appl. No.: 11/753,905

(22) Filed: May 25, 2007

(65) Prior Publication Data
US 2008/0294716 A1 Nov. 27, 2008

(51) Int. Cl.
*G06F 15/16* (2006.01)
(52) U.S. Cl. ........ 709/218; 709/203; 709/217; 705/14.4
(58) Field of Classification Search .......... 709/202–203, 709/217–219, 223–224; 707/10, 999.01; 705/14.4, 14.41, 14.49
See application file for complete search history.

(56) References Cited

U.S. PATENT DOCUMENTS

| | | | |
|---|---|---|---|
| 5,948,061 A * | 9/1999 | Merriman et al. | 709/219 |
| 6,009,410 A * | 12/1999 | LeMole et al. | 709/219 |
| 6,317,786 B1 * | 11/2001 | Yamane et al. | 709/224 |
| 6,438,543 B1 * | 8/2002 | Kazi et al. | 707/999.104 |
| 6,442,529 B1 | 8/2002 | Krishan | |
| 7,016,892 B1 * | 3/2006 | Kokkonen et al. | 705/26.8 |
| 7,076,495 B2 * | 7/2006 | Dutta et al. | 709/203 |
| 7,136,875 B2 | 11/2006 | Anderson | |
| 7,266,557 B2 * | 9/2007 | Aschen et al. | 707/10 |
| 7,644,414 B2 * | 1/2010 | Smith et al. | 719/328 |
| 7,702,724 B1 * | 4/2010 | Brydon et al. | 709/203 |
| 7,739,295 B1 * | 6/2010 | Agrawal et al. | 709/202 |
| 8,160,926 B1 * | 4/2012 | Ranganath et al. | 705/14.4 |
| 2002/0010794 A1 | 1/2002 | Stanbach, Jr. et al. | |
| 2003/0023489 A1 | 1/2003 | McGuire et al. | |
| 2004/0015564 A1 | 1/2004 | Williams | |
| 2004/0138943 A1 | 7/2004 | Silvernail | |
| 2005/0091111 A1 | 4/2005 | Green et al. | |
| 2006/0089871 A1 | 4/2006 | Takagi | |
| 2006/0168664 A1 | 7/2006 | Frank | |
| 2006/0265399 A1 | 11/2006 | De Filippi | |
| 2007/0083524 A1 * | 4/2007 | Fung et al. | 707/999.01 |
| 2007/0244746 A1 * | 10/2007 | Issen et al. | 709/224 |
| 2008/0243612 A1 * | 10/2008 | Blinnikka | 705/14 |

OTHER PUBLICATIONS

Dion Hinchcliffe, "Struggling to Monetize Web 2.0", web2.wsj2.com/struggling_to_monetize_web_20.htm.
Scottie Claiborne, "Monetizing Your Website", rightclickwebs.com/seo/monetize.php.
Jonh, "Monetizing Content in IE 7 with Q-Ads by Qumana", blog.qumana.com/blog/_archives/2007/1/17/2659340.html.
Julien Couvreur, "Curiosity is Bliss", blog.monstuff.com/archives/000304.html.
Ian Hickson, "HTML 5", whatwg.org/specs/web-apps/current-work/.

* cited by examiner

*Primary Examiner* — Bharat N Barot
(74) *Attorney, Agent, or Firm* — Shook Hardy & Bacon LLP

(57) ABSTRACT

Restricting a web page's access to web services that do not display advertisements endorsed by the web service or its owner is described herein. A web page includes an IFrame where an advertisement is presented. The web page provides the functionality of a web service by communicating requests to a server hosting the web service. On a client computing device, a user may initiate a request to access the web service. The request may be sent to a broker configured to submit the request to the hosting server. The web service is exposed in such a way that it can only be called by an endorsed IFrame, also responsible for displaying advertisement on the web page.

13 Claims, 5 Drawing Sheets

600

602

◁ ▷ 🏠 📄 🔍

604
LOCATE THE CAR OF YOUR DREAMS
MAKE [ ▼ ]   MODEL [ ▼ ]   YEAR [ ▼ ]

606
Microsoft Corporation, (NASDAQ: MSFT, HKSE: 4338) is a multinational computer technology corporation with global annual revenue of US$44.28 billion and 71,553 employees in 102 countries as of July 2006. It develops, manufactures, licenses, and supports a wide range of software products for computing devices. [5][4][2] Headquartered in Redmond, Washington, USA, its best selling products are the Microsoft Windows operating system and the Microsoft Office suite of productivity software, each of which has achieved near-ubiquity in the desktop computer market. Microsoft possesses footholds in other markets, with assets such as the MSNBC cable television network, the MSN Internet portal, and the Microsoft Encarta multimedia encyclopedia. The company also markets both computer hardware products such as the Microsoft mouse as well as home entertainment products such as the Xbox, Xbox 360 and MSN TV.[5]

Microsoft's name, originally bi-capitalized as *MicroSoft* or with hyphenation as *Micro-Soft*, is a portmanteau of "microcomputer software"[6] and is often abbreviated as *MS*. The company was founded in Albuquerque, New Mexico on April 4, 1975 by Bill Gates and Paul Allen to develop and sell BASIC interpreters for the Altair 8800.[1] After the market saw a flood of IBM PC clones in the mid-1980s, Microsoft used its new position, which it gained in part due to a contract from IBM, to dominate the home computer operating system market with MS-DOS, which stood for Microsoft Disk Operating System.[7] The company later released an initial public offering (IPO) in the stock market, which netted several of its employees millions of dollars due to the ensuing rise of the stock price.[8][9] The price of the stock continued its rise steadily into the early 2000s. In Microsoft Windows,

MICROSOFT CORPORATION

MICROSOFT
608 — GET QUOTE [MSFT] [GO]
TYPE  PUBLIC (NASDAQ:  MSFT )
FOUNDED  ALBUQUERQUE (APRIL 4, 1975) [1]
PHONE NO.  (999)999-9999
KEY PEOPLE  BILL GATES, CO-FOUNDER AND EXECUTIVE CHAIRMAN
PAUL ALLEN, CO-FOUNDER
STEVE BALLMER, CHIEF EXECUTIVE OFFICER
RAY OZZIE, CHIEF SOFTWARE ARCHITECT
INDUSTRY  COMPUTER SOFTWARE
PUBLISHING
RESEARCH AND DEVELOPMENT
COMPUTER HARDWARE
VIDEO GAMES
PRODUCTS  MICROSOFT WINDOWS
MICROSOFT OFFICE

*FIG. 6*

AD-FUNDED WEB SERVICES

BACKGROUND

The term "web services" describes a standardized way of integrating Web-based applications over a network, such as the Internet, using various standards and protocols. As described herein, a web service is any software designed to support interoperable machine-to-machine interaction over a network. In operation, a client computing device electronically submits a request along with input data to a server that is executing the web service. The server receives the request, perform an operation with the data, and returns results to the requesting client. Services may be simple, such as a service that returns stock quotes, or they may be more complex, such as a service that allows users to complete tax forms.

Unlike traditional client/server models, web services do not provide the user with a graphical user interface (GUI). Instead, web services share business logic, data, and processes using a programmatic interface across a network. Developers can seamlessly add a web service to a GUI (such as a Web page or an executable program) to offer specific functionality to users. For example, a web service may be configured to identify all of the pizzerias on a geographical map.

Developers constantly need better methods and tools for expanding Web functionality, and web-service providers have an interest to promote their web services. For example, users of a web service may bring traffic to a web site. Or increased use of a web service may enable an enterprise to develop a more accurate database, for example, a database of local restaurants. Therefore, web services provide useful tools that expand the functionality of the Web while at the same time provide an avenue for developers to market themselves.

Web-service developers currently have only two ways to capitalize on their web services. Either a given web service increases the developer's mind share (i.e., publicity), or fees may be collected from users using the web service. The first scenario does not produce a monetary incentive for the web-service developer, and the second scenario requires a contractual agreement that may be difficult to enforce. Consequently, the development and proliferation of web services is somewhat stifled.

Moreover, the Web has become an increasingly viable advertising medium. Banner, pop-up, and other ads are quite common in today's society. In general, web advertisements produce either click-through fees every time they are selected or impression fees every time they are displayed. These fees are paid by advertisers to the web sites that host their ads. No advertising dollars are paid, however, to the web services that may be offered on the host web sites. Consequently, web-service developers cannot generate income directly from advertising.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments are directed to authorizing web pages to use web services. A web service, in some embodiments, can only be invoked from an endorsed broker (i.e., a web page that has been authorized by the owner or administrator of the web service). The broker is responsible for displaying online advertisements as well as making web-service requests. Furthermore, advertisements can be targeted based on the information exchanged during a web service request and response.

In one embodiment, a web page includes an advertisement presented in an inline frame (IFrame). The web page provides the functionality of a web service by communicating XML, or similar messages, to the server hosting the web service. On a client computing device, a user may initiate a request to access the web service. The request can be sent to a broker that is configured to submit the request to the web service. On the server hosting the web service, a determination is made as to whether an endorsed advertisement (e.g., one that generates money for the owner) is being displayed on the web page. If so, the web service computes the request and returns the results.

Some embodiments are also directed to a graphical user interface (GUI) for displaying a web page and an advertisement on the web page. The advertisement is hosted in an IFrame. All requests to access a web service offered by the web page are communicated to a broker on the IFrame, and the broker submits the request to the web service for processing. Of particular importance is the advertisement itself, because the request is only calculated if the advertisement is endorsed by the web service or the owners of the web service.

BRIEF DESCRIPTION OF THE SEVERAL VIEWS OF THE DRAWINGS

The present invention is described in detail below with reference to the attached drawing figures, wherein:

FIG. 6 is an exemplary display of a graphical user interface for a web browser displaying a web page and an IFrame, according to an embodiment of the present invention.

DETAILED DESCRIPTION

Figure 1:
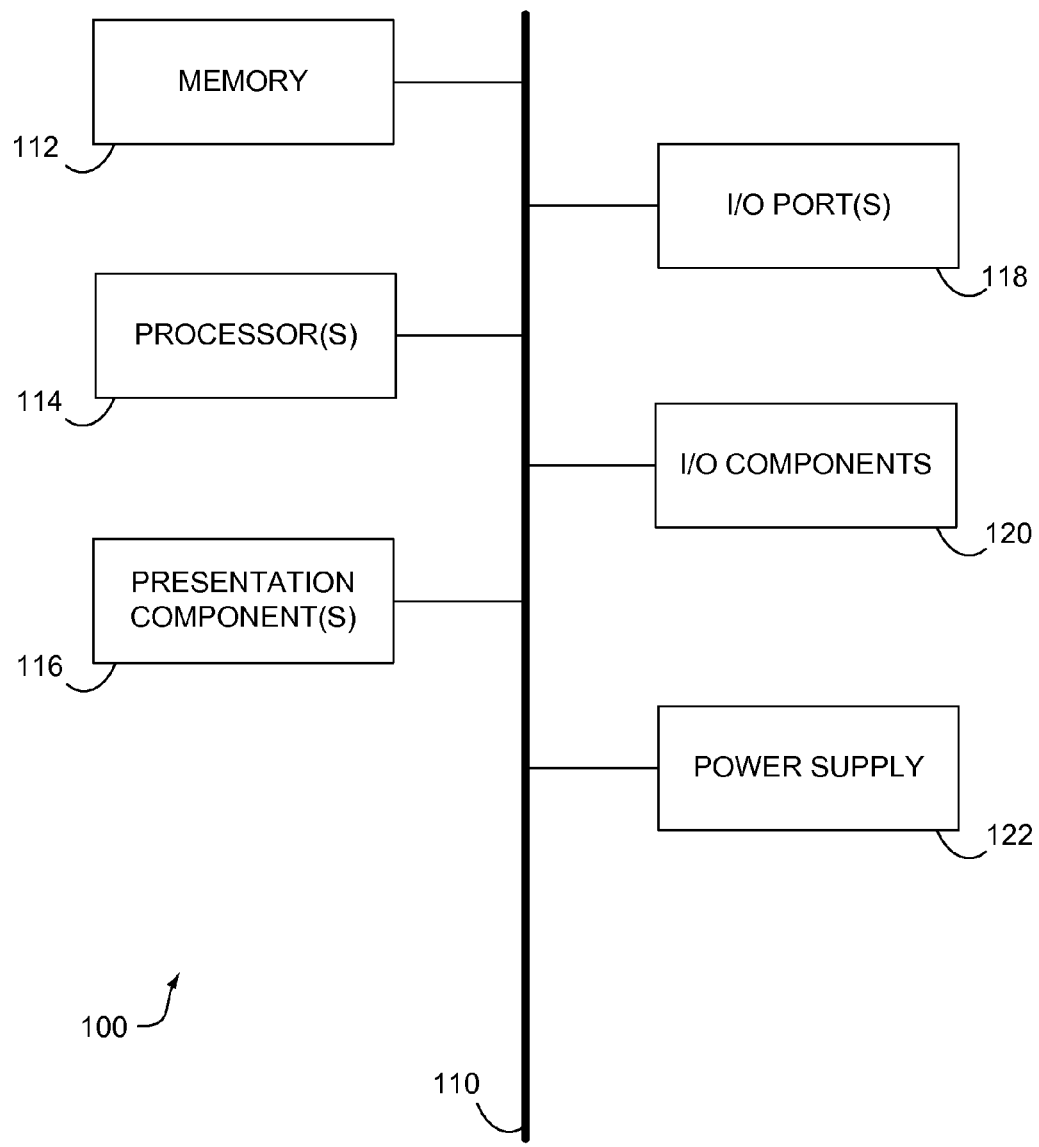
FIG. 1 is a block diagram of an exemplary operating environment for use in implementing an embodiment of the present invention.

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

As previously discussed, web-service developers traditionally have to rely on charging fees for the use of their web services. Such fees may be charged every time the web service is used (i.e., every time a server processes a web service query) or through a contractual agreement between the owner of a web page utilizing the web service and the web-service developer.

Embodiments described herein generally relate to a new method for monetizing the use of web services. In one embodiment of the present invention, a web service is limited to answering requests from web pages displaying web advertisements that are endorsed by the web service. In one embodiment, web services are only accessible when a requesting web page hosts an advertisement that will generate a fee for the owner of the web service. In other words, the web service is bundled with the web advertisement, and income generated on behalf of the web advertisement is paid to the owner of the web service. In such an embodiment, the web advertisement is displayed in a hypertext-markup-language (HTML) inline frame (IFrame), which is discussed in greater detail below. Fees may be charged whenever an advertisement is displayed on a web page or whenever a user selects the advertisement (i.e., clicks-through).

Web services, as described herein, refer to software designed to support interoperable machine-to-machine interaction over a network. In one embodiment, a web service is an application programming interface executing on a server and accessible to a remote computing device. Examples of web services include, without limitation, application programming interface (API) configured to search a database, check stock quotes, locate points on a map, access an e-commerce site's inventory, or store profile information for a web user. The list of existing and possible web services is virtually infinite, many of which are well known to those skilled in the art. For simplicity, the web service describe herein will be referred to as Search API; however, any other web service may alternatively be used.

Web services may communicate using extensible markup language (XML) messages containing various forms of data using the simple object access protocol (SOAP). For example, access to a search API may require an XML request that includes relevant parameters (e.g., time, location, or keywords). The web services described herein may also use the web services description language (WSDL) to describe web-service interfaces along with details to specific protocols. In addition, the web services may generate server and client code in WSDL. Furthermore, various web services may be listed or identified in the Universal Description Discovery and Integration (UDDI) registry, which includes a plethora of contact, identifier, category, and technical information about various web services. In the same vain, UDDI may be queried by SOAP messages in order to locate WSDL documents describing protocol bindings and message formats required to interact with the web services listed in UDDI. Those skilled in the art will appreciate that embodiments are not limited to any particular language, protocol, or registry; rather, numerous methods of communicating electronic information across a network may be used.

Having described a general overview of the embodiments described herein, an exemplary operating environment is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, smartphone, digital phone, handheld device, BlackBerry®, personal digital assistant (PDA), or other device capable of executing computer instructions.

The invention may be described in the general context of computer code or machine-useable instructions, including computer-executable instructions such as program modules, being executed by a computer or other machine, such as a PDA or other handheld device. Generally, program modules including routines, programs, objects, components, data structures, and the like, refer to code that perform particular tasks or implement particular abstract data types. Each module described herein may represent executable source code written in a well-known language, such as, for example, C, C++, C#, Java, or the like. Embodiments described herein may be practiced in a variety of system configurations, including hand-held devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
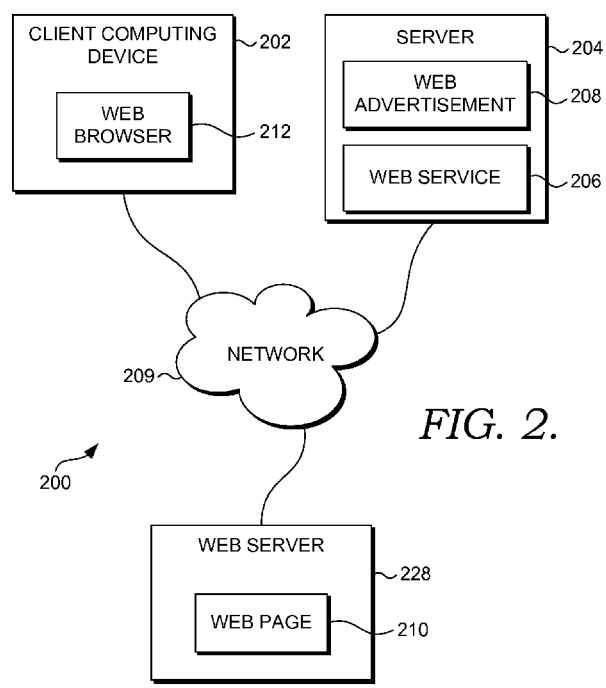
FIG. 2 is a block diagram of a networking environment for use in implementing an embodiment of the present invention.

Turning now to FIG. 2, a block diagram depicting a networking architecture 200 is shown for use in implementing an embodiment of the present invention. The networking architecture 200 comprises a client computing device 202, a server 204, and a web server 228, all of which communicate with each other via network 209. Networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

The client computing device 202 may be any type of computing device, such as device 100 described above with reference to FIG. 1. By way of example only and not limitation, the client computing device 202 may be a personal computer, desktop computer, laptop computer, handheld device, cellular phone, digital phone, smartphone, PDA, or the like. It should be noted that embodiments are not limited to implementation on such computing devices.

Network 209 may include any computer network or combination thereof. Examples of computer networks configurable to operate as network 209 include, without limitation, a wireless network, landline, cable line, digital subscriber line (DSL), fiber-optic line, local area network (LAN), wide area network (WAN), metropolitan area network (MAN), or the like. Network 209 is not limited, however, to connections coupling separate computer units. Rather, network 209 may also comprise subsystems that transfer data between servers or computing devices. For example, network 209 may also include a point-to-point connection, the Internet, an Ethernet, an electrical bus, a neural network, or other internal system.

In an embodiment where network 209 comprises a LAN networking environment, components are connected to the LAN through a network interface or adapter. In an embodiment where network 209 comprises a WAN networking environment, components use a modem, or other means for establishing communications over the WAN, to communicate. In embodiments where network 209 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

Furthermore, network 209 may also include various components necessary to facilitate communication with a mobile phone (e.g., cellular phone, Smartphone, Blackberry®). Such components may include, without limitation, switching stations, cell sites, Public Switched Telephone Network interconnections, hybrid fiber coaxial cables, or the like.

The server 204 and the web server 228 may be any type of application server, database server, or file server configurable to perform the methods described herein. In addition, each of the server 204 and the web server 228 may be a dedicated or shared server. One example, without limitation, of a server that is configurable to operate as the server 228 is a PowerEdge server manufactured by Dell, Inc. The server 228 may also be configured to run server software, such SQL Server 2005, which was developed by the Microsoft® Corporation, or Apache HTTP Server Project, developed by the Apache Software Foundation.

Components of the server 204 and the web server 228 may include, without limitation, a processing unit, internal system memory, and a suitable system bus for coupling various system components, including one or more databases for storing information (e.g., files and metadata associated therewith). Each server may also include, or be given access to, a variety of computer-readable media. By way of example, and not limitation, computer-readable media may include computer-storage media and communication media. In general, communication media enables each server to exchange data via network 209. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that networking architecture 200 is merely exemplary. While the servers 204 and 228 are illustrated as single boxes, one skilled in the art will appreciate that they are scalable. For example, the server 204 may in actuality include multiple boxes in communication in communication. The single unit depictions are meant for clarity, not to limit the scope of embodiments in any form.

The client computing device 202 comprises a web browser 212, which is a software application enabling a user to display and interact with information located on a web page. In an embodiment, the web browser 212 communicates with the server 204, the web server 228, and other components accessible over the network 209. Web pages may be located by the web browser 212 by sending a transferring protocol and the URL. The web browser 212 may use various URL types and protocols, such as hypertext transfer protocol (HTTP), file transfer protocol (FTP), real-time streaming protocol (RTSP), etc. The web browser 212 also understands a number of file formats—such as HTML, graphics interchange format (GIF), tagged image file format (TIFF), portable document format (PDF), or joint photographic experts group (PDF) file format, and the like—the wealth of which can be extended by downloaded plug-ins. Additionally, the web browser 212 may be any browser capable of navigating the Web, such as Internet Explorer®, Netscape Navigator, Mozilla, Firefox, etc.

In operation, a user accesses a web page 210 using the web browser 212. The web page 210 is stored on the web server 228, which is configured to transmit the HTML and other content associated with the web page 210 to client computing device 202. The web browser 212 is configured to render the web page 210 and display it to the user.

The web page 210 may include the functionality of a web service 206, which can be any type of web service described herein or well known to those skilled in the art. In some embodiments, the web page 210 comprises a web advertisement 208. One skilled in the art will appreciate that the web advertisement 208 may be displayed in various ways. Examples include, without limitation, a banner ad, pop-up ad, pop-under ad, interstitial ad, floating ad, expanding ad, polite ad, wallpaper ad, trick-banner ad, mobile, map ad, video ad, or the like. Moreover, data associated with the web advertisement 208 may be stored on the server 204, web server 228, or an advertisement server (not shown for clarity) that can communicate with the server 208, web server 228, or client computing device 202 via network 209.

To allow the web page 210 access to the web service 206, the web page 210 must display the web advertisement 208, which, in some embodiments, is endorsed by the developer, owner, or administrator of the web service 206. This allows the developer of the web service 206 to charge a fee for the display of advertisements, thus tying the web service 206 to the display of the web advertisement 208. While embodiments are described herein with reference to one web advertisement 208, the web advertisement 208 may comprise numerous web advertisements.

In operation, the web page 210 can access the web service 206. Accessing may be done in a number of ways understood by those skilled in the art. In one embodiment, an IFrame is created and included in the web page 210. An IFrame is an HTML element that makes it possible to embed another HTML document inside a main document. For example, a banner ad may consist of an IFrame that points to a specific URL where an advertisement is located. In the above embodiment, the IFrame comprises images associated with the web advertisement 208 and a broker (shown in FIG. 3 and discussed below) that receives requests to use the web service 206, transmits those requests on to server 204 for processing, and receives their results.

The following pseudo-code illustrates sample logic that can be embedded within the IFrame of the web page 210 in order to access the web service 206.

```
<source = http://www.webpage.com/Search_API>
<insert = Search_API module>
```

The above, or similar, code creates a pointer to the web service Search_API, which is located at the uniform resource locator (URL) http://www.webpage.com/Search_API. Once the pointer is created, the web service 206 may be called, in one embodiment, by executing the following scripting language.

```
<Get Search_API module>
<Call Search_API>
<Get Results>
```

The above code sends a request to the server 204 to execute the web service 206. Additional parameters may be transmitted along with the request. For example, a web service that searches databases of e-commerce merchants for specific goods may pass along keywords relevant to the goods a user desires. In another example, a user's name, date of birth, and driver license number may be sent to a service that locates inexpensive rental cars. The above pseudo-code is provided merely as an example, and embodiments described herein should not be limited thereto.

Figure 3:
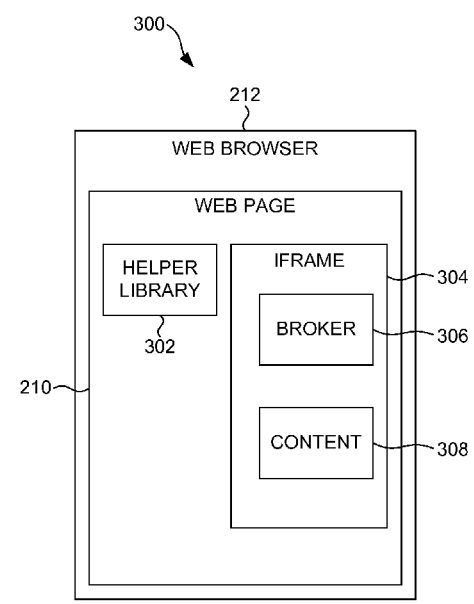
FIG. 3 is a block diagram illustrating the components within a web browser, according to an embodiment of the present invention.

Turning now to FIG. 3, a block diagram 300 is shown illustrating the components within a web browser in accordance with an embodiment of the present invention. The web browser 212 comprises the web page 210, which includes a helper library 302 and an IFrame 304. In some embodiments, however, the helper library 302 may not be present.

The helper library 302 includes shortcuts for calling web services so that web-page developers do not have to know routine calls for every desirable web service. In one embodiment, the helper library 302 contains one or more functions for requesting the web service 206 through a broker 306 in the IFrame 304. The helper library 302 contains executable scripting language (e.g., JavaScript) for making such requests to the broker 306. Furthermore, the functions in the helper library may pass user parameters (e.g., time, stock symbol, keywords) along with requests to access the web service 206. For example, if a web service could look up the price of a stock, the helper library 302 may contain a function that submits a request to the broker 306 to access the web service 206 for a particular stock symbol. The helper library is not essential in all embodiments, however. Instead, it merely provides shortcuts for web-page developers call a plethora of web services.

The IFrame 304 is an HTML element within the web page 210 that generates a window for the web advertisement 208 on the web page 210. FIG. 6 provides a graphical depiction of an IFrame 604 displayed within a web page 606. Referring back to FIG. 3, the IFrame comprises a broker 306 and web content 308. The broker 306 is a piece of executable scripting language (e.g., JavaScript) that receives requests, and possibly parameters, to utilize the web service 206. Once received, the broker 306 relays requests and parameters to the web service 206 via network 209.

As one skilled in the art will appreciate, if the web browser 212 enforces a Same Domain Policy, requests to access the web service 206 that originate from the web page 210 will not be executed because they are passed through multiple web domains—namely, the IFrame and the web page 210. A conventional XMLhttp request cannot reach a web service in a different domain. In other words, the web browser 212's Same Domain Policy may prevent cross-site calls. To overcome these security measures, various cross-document messaging techniques can be used.

In one embodiment, a Dynamic HTML (DHTML) implementation is used that allows multiple IFrames in multiple domains to communicate. This effectively bypasses the Same Domain Policy in the web browser 212. The DHTML implementation uses one or more dynamically created IFrames, which are configured to use fragment identifiers to communicate information between the domain of the web page 210 and the domain of the IFrame 304. Timers may also be used to organize monitoring for changes to the IFrame 304. For example, if the IFrame 304 is in a different domain than the web page 210, the IFrame 304 may be configured to create a new IFrame and load it with a URL in the same domain as the web page 210. More specifically, the URL may be cached in a way that it will not generate a request to a server. A fragment identifier can then be used to communicate changing information between the web page 210 and the IFrame 304.

In another embodiment, an HTML-5 API enables cross-document messaging. In one embodiment, the API includes postMessage(message) method. As one skilled in the art will understand, when postMessage(message) is invoked on a document object, a message is created that uses the MessageEvent interface. That interface includes the event name "message," which bubbles, is cancelable, and has no default action. A "data" attribute must be set to the value passed as the message argument to the postMessage(message) method, and a "domain" attribute must be set to the domain of the document associated with the script that invoked the postMessage (message) message (hereinafter referred to as the invoking document). In addition, a "uri" attribute must be set to the URI of the invoking document, and a "source" attribute must be set to the document object representing the invoking document. The event can then be dispatched at the document object itself.

The following example of the above cross-messaging technique is provided for clarity. If the web page 210 contains an object element that contains the IFrame 304 and script or HTML language in the web page 210 calls postMessage( ) on the IFrame 304, then a message event will be communicated on the object element and marked as originating from the web page 210. For instance, the script in the web page 210 might look like the following.

```
var o = document.getElementsByTagName('object')[0];
o.contentDocument.postMessage('Hello world');
```

Moreover, the IFrame 304 may use an event handler to handle incoming events. One skilled in the art will appreciate that various programming techniques for implementing event handlers are well known; therefore, embodiments described herein should not be limited thereto.

Alternatively, browser extensions (e.g., Flash or ActiveX) may be used to bypass the Same Domain Policy of the web browser 212. In one embodiment, a browser extension is loaded multiple times—once in the IFrame 304 and once in the web page 210. The extensions can then communicate changes to one another using one or more APIs that are generally well known to those skilled in the art.

In an embodiment, the web service 206 only needs to make itself available in a single domain (either the IFrame 304 or the web page 210). In another embodiment, the web service 206 is configured to only respond to requests if they originate from an IFrame endorsed by the web-service 206's host. Endorsed, as described herein, can mean, for example: the web service 206 receives a fee from the web page 210's owner or developer for displaying the web advertisement, or the host of the web-service 206 has authorized the web page 210's owner or developer to access to the web service 206. Each way provides owners of the web service 206 with a method of controlling access to the web service 206.

Content 308 is simply web content for display in the IFrame 304. This may include any type of image, video, audio, graphic, or other multimedia used in web advertising. In one embodiment, the type of advertisement or content 308 to display is determined by monitoring parameters in requests to the web service 206. For example, if a user wishes to view a stock symbol for a company like Microsoft®, the web advertisement may be dynamically changed to display an advertisement for Microsoft® products. Monitoring of advertisements may be done by a web service executing on the server 204, which may be configured to select advertisements for the IFrame 304 based on queries to an advertisement server that stores various advertisement attributes.

Figure 4:
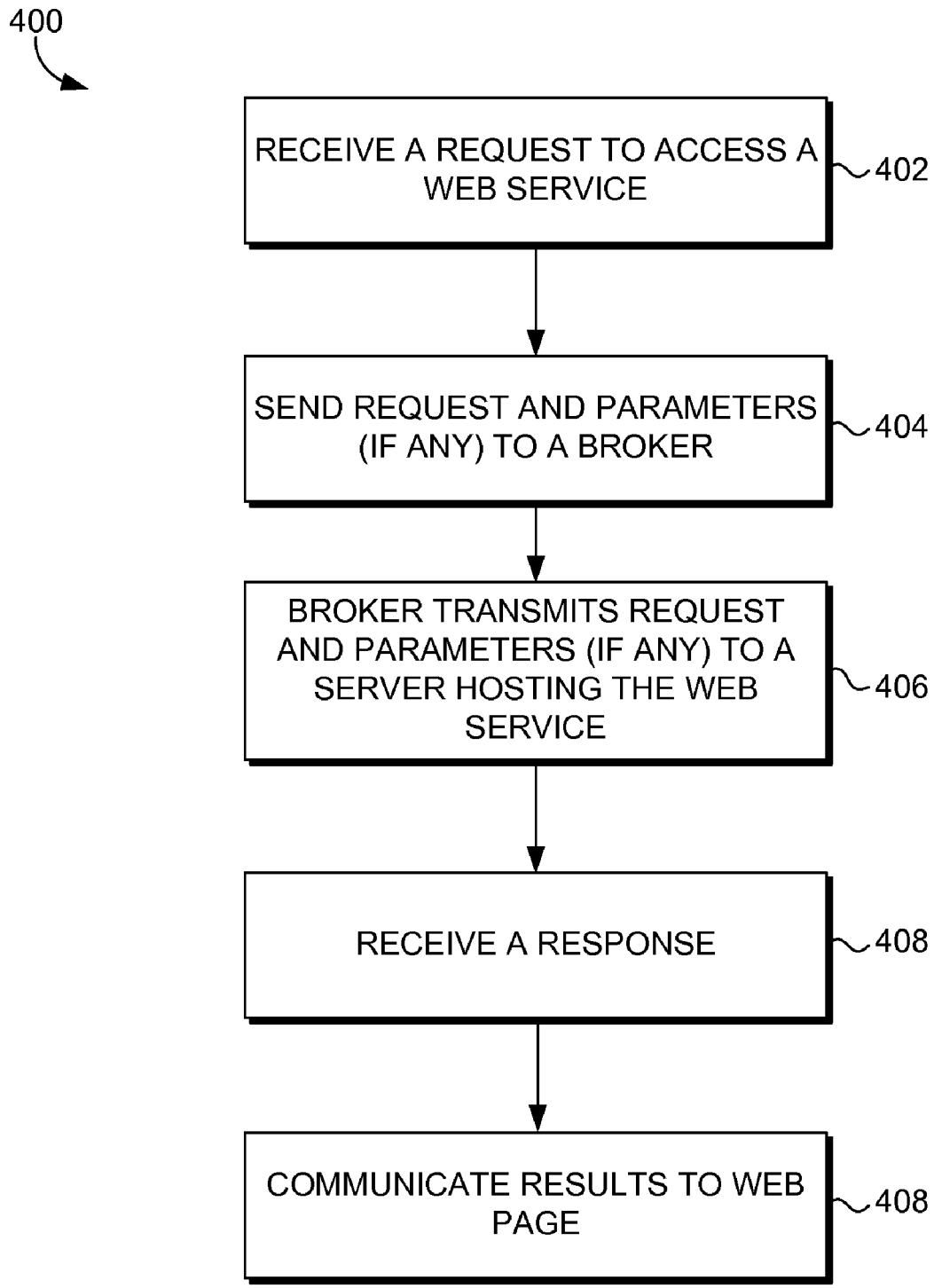
FIG. 4 is a flowchart illustrating a process for relaying a request to access a web service from a web page through an IFrame, according to an embodiment of the present invention.

Turning now to FIG. 4, a flowchart is shown illustrating a process 400 for relaying a request to access a web service from a web page through an IFrame, according to an embodiment of the present invention. Initially in process 400, a computing device receives a request to access a web service, as indicated at 402. This may come from a user selecting a certain action on a web page, or automatically when a user performs another function (e.g., refreshes a web page that contains dynamic content). Along with the request, parameters may also be received—such as, keywords, names, time, or the like. In one embodiment, the request, and necessary parameters, are sent to a broker, or proxy, encompassed in an IFrame on a web page, as indicated at 404. Any of the aforementioned or well-known cross-document messaging techniques may be used to transmit the request and parameters to the broker while not violating the Same Domain Policy of the web browser. The broker transmits the request and any parameters to a server hosting the web service, as indicated at 406.

Figure 5:
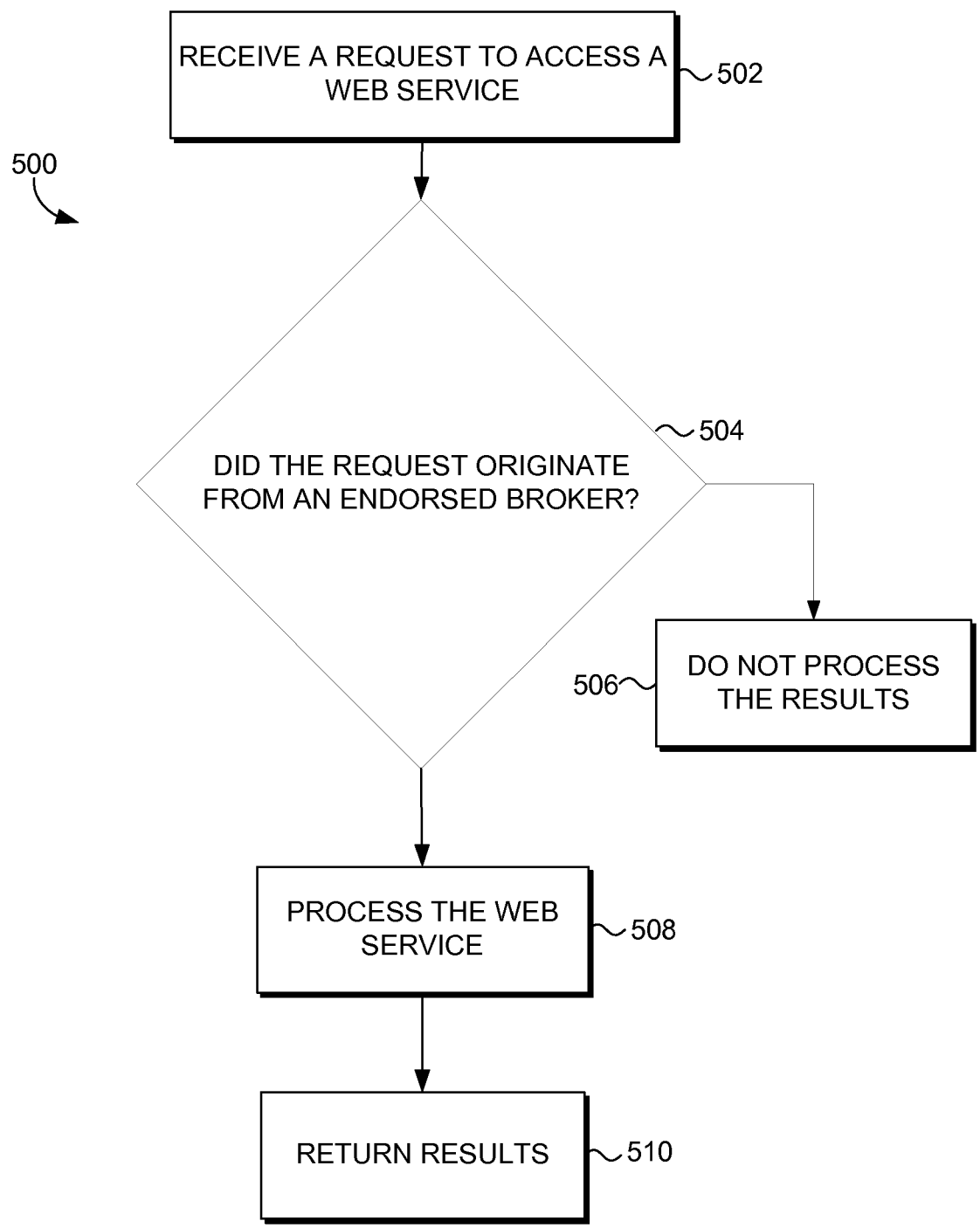
FIG. 5 is a flowchart illustrating a process for determining whether a request to access a web service originated from a web page displaying a specific web advertisement, according to an embodiment of the present invention.

FIG. 5 is a flowchart illustrating a process for determining whether a request to access a web service originated from a web page displaying a specific web advertisement, according to an embodiment of the present invention. Initially, a request is received by a server, or other computing device, to access a web service executing thereon, as indicated at 502. It is then determined whether the URL associated with the device that made the request is displaying an advertisement endorsed by the web service, as indicated at 504. This determination can be made by retrieving the content being displayed within the URL responsible for making the request and comparing attributes associated with such content with a database of content endorsed by the web service. Other methods are also possible and will be generally well known to those skilled in the art. If the request originated from a URL not displaying endorsed content, the web-service request is not processed, as indicated at 506. If the URL is displaying endorsed content, the web service is processed (indicated at 508), and results are returned to the URL (indicated at 510).

FIG. 6 is an exemplary display of a GUI 600 for a web browser displaying a web page and an IFrame, according to an embodiment of the present invention. GUI 600 comprises display areas within a web browser 602 for a web page 606 that provides a user with some web-service functionality and an IFrame 604 that displays an advertisement. In the example depicted in FIG. 6, the web page 506 presents information about the company Microsoft®, and the advertisement presents a gateway to a web page that sells cars. Because the advertisement is displayed within an IFrame, the advertisement's content may be updated without refreshing the content of the web page 506. In addition to displaying web content, the IFrame provides access to various web services that endorse the advertisement.

A text field 608 allows a user to submit parameters and access a web service for information. In the depicted case, the user can enter a stock symbol to a web service to retrieve the underlying company's current stock price. In one embodiment, the stock symbol would be passed along with a request to access the web service to a broker running in the IFrame. The broker would then submit the request and the stock symbol to the web service, which would determine whether the advertisement within the IFrame 504 was endorsed by the web service. If so, the web service would retrieve the stock price and return it to the broker, which would return it to the web page 506 for display.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. One or more computer readable storage device having computer-executable instructions embodied thereon that, when executed by a client computing device, provide a method of screening requests to receive information from a web service, the method comprising:

presenting, by a browser executed by the client computing device, a webpage including an inline frame (iFrame), wherein the iFrame includes an advertisement having an advertisement identifier that identifies the advertisement and includes a web-services broker;

receiving by the browser a request to retrieve web-service-generated information from the web service;

responsive to the request to retrieve the web-service-generated information, executing a cross-document messaging technique with the web-services broker to convey the request to the web-services broker, wherein execution of the cross-document messaging technique exchanges a message between the webpage and the web-services broker that are both executed within the browser;

creating, by the web-services broker, a web-service request that includes the advertisement identifier, which identifies the advertisement that is presented;

transmitting, by the browser, the web-service request, which includes the advertisement identifier, to a server hosting the web service; and receiving, by the browser, the web-service-generated information when the advertisement is deemed endorsed.

2. The one or more computer readable storage device of claim 1, further comprising presenting the web-service-generated information to a user.

3. The one or more computer readable storage device of claim 1, wherein the web-service request includes one or more parameters.

4. The one or more computer readable storage device of claim 3, wherein the one or more parameters include at least one of a keyword, user name, location, or time.

5. The one or more computer readable storage device of claim 1 further comprising, cross-document messaging the request from the web page.

6. The one or more computer readable storage device of claim 1, wherein an owner of the web service receives a fee in exchange for display of the advertisement among the webpage content.

7. The one or more computer readable storage device of claim 1 further comprising, assessing a monetary fee to an owner of the web page to be paid to an owner of the web service.

8. The one or more computer readable storage device of claim 1, wherein the web-service request is an extensible markup language (XML) message.

9. The one or more computer readable storage device of claim 1, wherein the web-service request is sent using a simple object access protocol (SOAP).

10. A graphical user interface embodied on a computer readable storage device and executable on a computer, the graphical user interface comprising:
 a first display component that displays a web page, wherein the web page includes a web-service-result display area configured to display information provided by a web service; and
 a second display component that includes an iFrame,
  wherein the iFrame displays an advertisement and includes a web-service broker,
  wherein the web-service broker exchanges cross-document messages to receive a request to access the web service, and
  wherein the web-service broker generates a web-service request including an advertisement identifier that identifies the advertisement.

11. The graphical user interface of claim 10, wherein one or more results from a request to utilize the web service are presented on the web page.

12. The graphical user interface of claim 10, wherein the URL is included within the web-service request to enable a web-service provider to determine whether the advertisement is endorsed.

13. A method of screening requests to receive information from a web service, the method comprising:
 presenting, by a browser executed by the client computing device, a webpage including an inline frame (iFrame), wherein the iFrame includes an advertisement having an advertisement identifier that identifies the advertisement and includes a web-services broker;
 receiving by the browser a request to retrieve web-service-generated information from the web service;
 responsive to the request to retrieve the web-service-generated information, executing a cross-document messaging technique with the web-services broker to convey the request to the web-services broker;
 creating, by the web-services broker, a web-service request that includes the advertisement identifier, which identifies the advertisement that is presented;
 transmitting, by the browser, the web-service request, which includes the advertisement identifier, to a server hosting the web service; and
 receiving, by the browser, the web-service-generated information when the advertisement is deemed endorsed.

* * * * *